United States Patent [19]

Akers et al.

[11] 4,283,213
[45] Aug. 11, 1981

[54] METHOD OF FABRICATION OF SINGLE MODE OPTICAL FIBERS OR WAVEGUIDES

[75] Inventors: Francis I. Akers; Mokhtar S. Maklad, both of Roanoke, Va.

[73] Assignee: International Telephone and Telegraph Corporation, New York, N.Y.

[21] Appl. No.: 86,856

[22] Filed: Oct. 22, 1979

[51] Int. Cl.³ ............................................ C03C 25/02
[52] U.S. Cl. .......................................... 65/3 A; 65/2; 65/13; 427/163
[58] Field of Search ................ 65/2, 3 A, 13; 427/163

[56] References Cited

U.S. PATENT DOCUMENTS

| | | | |
|---|---|---|---|
| 3,877,912 | 4/1975 | Sliraishi et al. | 65/3 A |
| 4,123,483 | 10/1978 | Nakahara et al. | 65/3 A X |
| 4,155,733 | 5/1979 | Sandbank et al. | 65/3 A |

FOREIGN PATENT DOCUMENTS 2545317  4/1977  Fed. Rep. of Germany ............ 65/3 A Primary Examiner—Robert L. Lindsay, Jr.
Attorney, Agent, or Firm—John T. O'Halloran; Peter C. Van Der Sluys

[57] ABSTRACT

A method for fabricating a fiber with optical cores of diameters between 2 to 20 microns is depicted. A first step includes the fabrication of a step-index preform of predetermined dimensions. The preform is drawn into a conventional fiber by conventional techniques resulting in a fiber having an outer diameter of about 120 microns or larger. The fiber is then emplaced in a glass tube. The tube is collapsed on the fiber by heating the same resulting in a second preform. This preform is again drawn into a fiber by conventional techniques to obtain a final fiber having core dimensions indicative of single mode operation with compatible outer diameters.

15 Claims, 4 Drawing Figures

U.S. Patent  Aug. 11, 1981  4,283,213
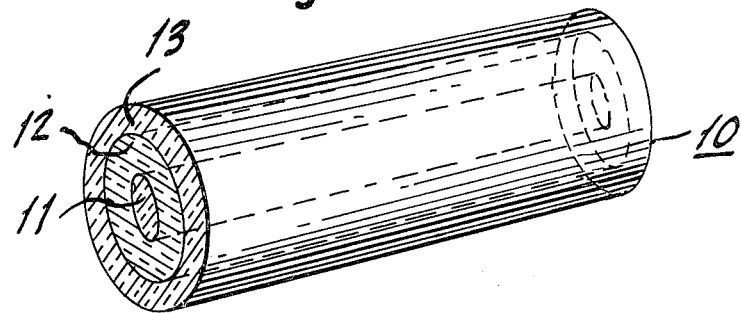
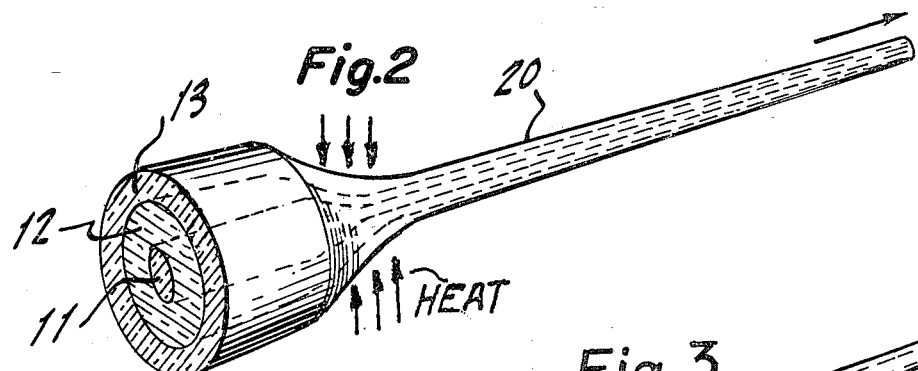
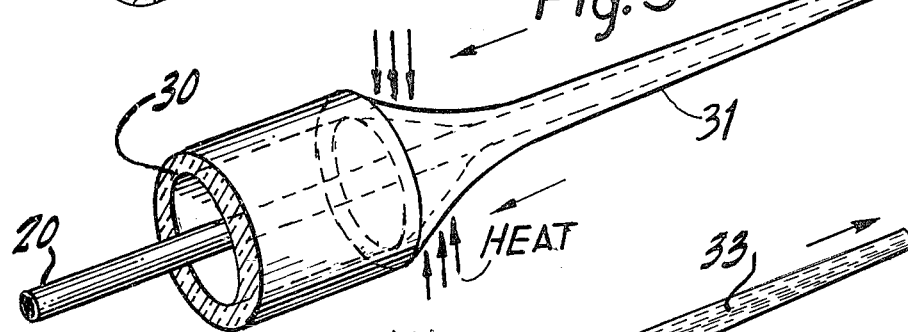
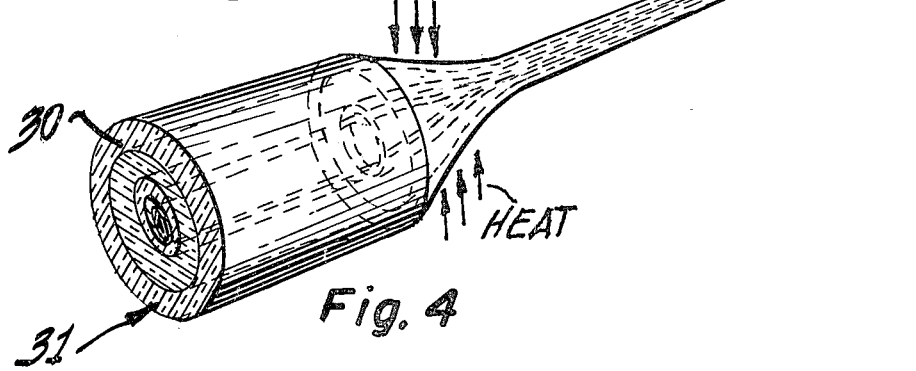

METHOD OF FABRICATION OF SINGLE MODE OPTICAL FIBERS OR WAVEGUIDES

BACKGROUND OF THE INVENTION

This invention relates to the fabrication of optical waveguides and more particularly to optical fibers capable of single mode operation.

The majority of fibers presently provided are referred to as step-index multi-mode and graded index multi-mode fibers. A single mode fiber can propagate optical signals with low loss at extremely large bandwidths but are very difficult to fabricate.

Of the commercially available fibers, the step-index fiber is less expensive and basically consists of a glass core of uniform refractive index surrounded by a cladding glass of a slightly lower index of refraction. The more expensive graded index fiber has a core with a refractive index profile that is radially symmetrical and approximately parabolic in shape, being highest at the center of the core and decreasing parabolically until it matches the cladding refractive index at the core-clad interface.

In both step and graded index fibers, the light signal is carried in a large number of modes, each with a characteristic group velocity and propagation time. Single mode fibers are capable of accommodating larger bandwidths than either the step or graded fibers.

Using present day techniques, single mode fibers are still in the experimental stage due to the extremely small core sizes required. Certain techniques for providing single mode fibers require producing a core by the buildup of extremely thin layers. The layers are extremely difficult to control and hence, variations in composition degrade the fiber operation. As indicated, in order to accommodate single mode operation, one has to provide fibers with homogeneous cores having diameters of between 2 to 20 microns and this is extremely difficult using prior art techniques.

It is therefore an object to provide a fabrication process for producing single mode fibers having uniform core characteristics with extremely small diameters.

DESCRIPTION OF THE PREFERRED EMBODIMENT

A method for fabricating an optical fiber comprising the steps of forming a first glass preform having a central core region of a given diameter, a cladding layer surrounding said core and a substrate layer surrounding said cladding layer, heating and drawing said first preform into a first fiber having a core of a smaller diameter, collapsing a glass tube about said first fiber to form a second preform having said smaller diameter core, and heating and drawing said second preform into a second fiber having a core diameter substantially smaller than the diameter of said first fiber, whereby said second fiber is capable of single mode operation.

BRIEF DESCRIPTION OF THE DRAWINGS

Above-mentioned and other features and objects of this invention will become more apparent by reference to the following description taken in conjunction with the accompanying drawings, in which:

FIG. 1 is a diagrammatic view of a typical optical fiber;

FIG. 2 is a diagrammatic view of a pulling operation to form a fiber;

FIG. 3 is a diagrammatic view of a step in the production of a single mode fiber preform; and FIG. 4 is a diagrammatic view of a pulling operation to form a single mode fiber according to this invention.

DETAILED DESCRIPTION OF THE INVENTION

Referring to FIG. 1, there is shown a step-index optical preform 10. The preform comprises an inner core 11 fabricated from an optical glass. The core 11 is surrounded by an optical cladding layer 12, which in turn is surrounded by a quartz substrate layer 13. There are many techniques known in the prior art to fabricate step-index preforms such as 10. For example, optical preforms are formed by employing a rotating planar starting member and glass particles provided by vapor deposition or other techniques are deposited on a surface of the starting member. By varying the doping of the layers, one can obtain step-index or graded index preforms. As indicated, the formation of preforms by these techniques as well as by many other techniques are well known in the art.

Once the preform 10 is fabricated, it is then drawn into a fiber (FIG. 2) by a suitable pulling operation under control of a heat source as available from a torch, a laser or other source. The preforms are usually softened in a furnace or by another source of heat and pulled under slight tension into thin glass fibers having a core 11, a cladding layer 12 and a substrate layer 13. The substrate layer is usually fabricated from quartz or a suitable glass. The fiber 20, according to the formation of the preform may be of an optical grade doped silicon dioxide ($SiO_2$) composition.

In any event, present techniques can provide fibers 20 (FIG. 2) having outer diameters of about 127 microns or larger with core diameters of about or greater than 50 microns. These fibers 20 are presently used as step-index or graded index optical waveguides and are well known and conventional.

In FIG. 3 and according to the method described herein, the resultant fiber 20 is surrounded by a substrate tube or cylindrical member 30. The tube 30 is available as a standard component fabricated from quartz or a borosilicate glass composition. The tube 30 is then heated uniformly while surrounding the fiber 20 and is collapsed about the periphery of the fiber 20 to form a second preform 31 of FIG. 4. This preform has the inner core of fiber 20, a cladding layer surrounding the inner core, a first substrate layer and another layer formed by collapsing the tube 30. The tube 30 may have a wall thickness of about 1.0 to 3.0 mm and when collapsed, increases the outer diameter of the fiber 20 by 0.1 to 4.0 mm. The tube 30 is heat shrunk about the fiber 20 at temperatures of about 2000° C.

The composite structure 31 of FIG. 4 serves as a second preform and is again pulled into a fiber at a desired rate to achieve the required core diameter of between 2 to 20 microns, while maintaining proper core size ratio with respect to the outer diameter of the resultant fiber 33. Thus, core diameters of 4 microns or less can be accommodated by the above described two step process and single mode operation is achieved with such fibers 33, due to their dimensions.

One can form the cores of preforms as 10 of FIG. 1 using germanosilicate glass or phosphosilicate glass to assure uniformity of the core structure necessary for high efficiency single mode operation and to achieve numerical aperture ranging from 0.08 to 0.25. The collapsed tube 30 enables control of the outer diameter while providing a rigid mechanical preform capable of being easily handled by conventional optical fiber procedures.

The fabircation process permits rapid production of single mode fibers using conventional and known equipment presently available such as furnaces, torches and so on. The techniques permit the accurate control of core size by using known pulling techniques while one is completely assured that the core composition is uniform due to the formation of the first and second preforms. By controlling the rate at which the fiber 33 is drawn, one has complete control of all parameters necessary to produce single mode fibers using conventional methods associated with the fabrication of step and graded index fibers.

It is apparent that many modifications and variations may be discerned by those skilled in the art without departing from the scope of the concepts disclosed herein.

We claim:

1. A method for fabricating an optical fiber comprising the steps of:
   forming a first solid glass preform having a central core region of a first diameter, a cladding layer surrounding said core and a substrate layer surrounding said cladding layer,
   heating and drawing said first solid preform into a first fiber having a core of a second diameter smaller than said first diamater,
   collapsing a glass tube about said first fiber by heat shrinking to form a second solid preform having a core of the second diameter,
   heating and drawing said second solid preform into a second fiber having a core of a third diameter substantially smaller than the second diameter of said first fiber, whereby said second fiber is capable of single mode operation.
2. The method according to claim 1 wherein said first preform is a step-index preform.
3. The method according to claim 1 wherein said first fiber has an outer diameter of greater than 120 microns with a core diameter of greater than 50 microns.
4. The method according to claim 1 wherein said second fiber has a core diameter between 2 to 20 microns.
5. The method according to claim 1 wherein said core is fabricated from a silicate glass doped with germanium or phosphorous.
6. The method according to claim 1 wherein said glass tube is collapsed by heating the same at a temperature in excess of 1500° C.
7. The method according to claim 1 wherein said glass tube has a wall thickness between 1.0 to 3.0 mm.
8. The method according to claim 1 wherein said glass tube is fabricated from a quartz glass.
9. The method according to claim 1 wherein said substrate layer is fabricated from a quartz glass with said core and cladding layer fabricated from a silicate glass.
10. The method according to claim 1 further comprising the steps of heating said first preform to soften the same prior to drawing said preform into said first fiber.
11. The method according to claim 1 wherein said core is fabricated from a silicate glass doped with phosphorous and germanium.
12. The method according to claim 1 wherein said glass tube is fabricated from a borosilicate glass.
13. The method according to claim 1 wherein said substrate layer is fabricated from a borosilicate glass and said cladding layer fabricated from a silicate glass.
14. The method according to claim 8 wherein said substrate comprises a silica tube with a borosilicate layer deposited on the inside of the said tube.
15. The method according to claims 9 or 12 or 14 wherein said first fiber is fabricated from an optical grade pure silicon dioxide composition.

* * * * *